United States Patent
Lynch et al.

[11] Patent Number: 5,869,125
[45] Date of Patent: Feb. 9, 1999

[54] WHIPPED LOW FAT SPREAD

[75] Inventors: Robert Lynch, Buffalo; John S. O'Mahony, Clarence Center, both of N.Y.

[73] Assignee: Rich Products Corporation, Buffalo, N.Y.

[21] Appl. No.: 877,572

[22] Filed: Jun. 17, 1997

[51] Int. Cl.$^6$ .................................................. A23D 7/00
[52] U.S. Cl. ..................... 426/603; 426/312; 426/564; 426/572; 426/601; 426/602
[58] Field of Search ..................... 426/603, 601, 426/602, 572, 312, 564

[56] References Cited

U.S. PATENT DOCUMENTS

| | | | |
|---|---|---|---|
| 1,749,427 | 3/1930 | Hoffman | 426/581 |
| 3,751,265 | 8/1973 | Senden | 426/572 |
| 3,809,764 | 5/1974 | Gabby et al. . | |
| 3,944,680 | 3/1976 | van Pelt | 426/569 |
| 3,958,033 | 5/1976 | Sims | 426/602 |
| 4,012,533 | 3/1977 | Jones | 426/565 |
| 4,350,715 | 9/1982 | Rek | 426/572 |
| 4,396,638 | 8/1983 | Edo | 426/613 |
| 4,431,682 | 2/1984 | Smith | 426/572 |
| 4,450,182 | 5/1984 | Stahl | 426/570 |
| 4,451,492 | 5/1984 | Dell | 426/570 |
| 4,478,867 | 10/1984 | Zobel | 426/572 |
| 5,149,559 | 9/1992 | Alaers et al. . | |
| 5,290,581 | 3/1994 | Campbell | 426/602 |
| 5,336,514 | 8/1994 | Jones | 426/602 |
| 5,346,716 | 9/1994 | Bakal et al. . | |
| 5,352,475 | 10/1994 | Tholl . | |
| 5,360,624 | 11/1994 | Okura | 426/603 |
| 5,393,549 | 2/1995 | Badertocher | 426/572 |
| 5,478,588 | 12/1995 | Talignami | 426/572 |
| 5,494,694 | 2/1996 | Herrmenn | 426/602 |
| 5,529,800 | 6/1996 | Bourns | 426/572 |
| 5,536,523 | 7/1996 | Blauel et al. . | |
| 5,591,725 | 1/1997 | Norton . | |
| 5,614,245 | 3/1997 | Gupta et al. . | |
| 5,624,702 | 4/1997 | Schotel . | |
| 5,690,986 | 11/1997 | Okutonu | 426/604 |

FOREIGN PATENT DOCUMENTS

| | | |
|---|---|---|
| 0 185 000 | 6/1986 | European Pat. Off. . |
| 0 385 542 | 9/1990 | European Pat. Off. . |
| 355007007A | 1/1980 | Japan . |
| 408116876A | 5/1996 | Japan . |

OTHER PUBLICATIONS

Schmidt 1996 Chef's Book of Formulas, Yelds & Sizes Van Nostrand Reinhold New York pp. 56 & 57.

Charley 1970 Food Science The Ronald Press Co., New York pp. 340–346.

Arbuckle 1977 Ice Cream 3rd Edition AVI Publishing Westport CT pp. 192–201, 264–266, 382–384.

Kraft, Ireme 1995 Using the Right Fat is the Key to Baking Success St Lows Post Despatch Dec. 4, 1995, Food Section p. 3.

Philadelphia Daily News Feb. 18, 1987 p. 8 What a Spread.

Dialog Abstract #07167026 Butter Test Alaon Reacon Journal.

Primary Examiner—Carolyn Paden
Attorney, Agent, or Firm—Kenyon & Kenyon

[57] ABSTRACT

The present invention provides an oil-in-water emulsion spread that has a low fat content and good spreading properties at all temperatures from 4° C. to 25° C. The present whipped spread comprises a continuous aqueous phase comprising (A) from about 10% to about 45% fat, wherein at least a portion of the fat is vegetable oil; (B) an effective amount of an emulsifier; and (C) an effective amount of an emulsion stabilizing agent. The whipped spread has a whipping overrun of at least about 200%.

27 Claims, 1 Drawing Sheet

WHIPPED LOW FAT SPREAD

FIELD OF THE INVENTION

The present invention relates to low calorie spreads that are suitable as butter and margarine substitutes. In particular, the invention relates to low fat whipped spreads that are readily extruded and spreadable and are suitable for baking.

BACKGROUND OF THE INVENTION

In recent years medical experts and health organizations have recommended that consumers reduce their fat intake as well as their cholesterol intake. The Surgeon General, for example, has recommended the maintenance of desirable weight through caloric control. Butter and margarine are both significant sources of fat and calories and butter is a significant source of cholesterol.

Butter contains a high level of animal fat (about 80 to 82%) which many consumers find unacceptable. Margarine is usually produced from an emulsion of oils and fats derived from vegetables. Since margarines are derived from vegetable fats they are cholesterol free, however, margarine contains the same amount of fat as butter.

Attempts have been made to reduce the fat content in butter-like and margarine-like spreads. For example, the proportion of the fat in butter can be replaced by vegetable fats, which are considered to be nutritionally more acceptable than animal fats. Substitution of some or all of the animal fat with vegetable fat to produce a lower cholesterol butter has the added benefit of softening the end product and making it more spreadable. (EPO 0,185,000A2).

However, low calorie, reduced fat margarine-like and butter-like spreads have not met with consumer expectations in that they are not stable and in that the fat and caloric reductions are not sufficient. These low fat spreads are generally fat-continuous emulsions (U.S. Pat. No. 5,591,725 to Norton) or water-in-oil emulsions (EPO 0,385,542A to Alares, et al; EPO 0,185,000A to Walgren, et al.; U.S. Pat. No. 5,352,475; Alaers, et al. U.S. Pat. No. 5,149,559) having a fat content of about 20 to 80%.

There are also low fat spreads that are oil-in-water emulsions containing vegetable or whey proteins (35 to 80% fat) (U.S. Pat. No. 5,536,523 to Blauel, et al.) and whipped low fat spreads such as the gas-in-water foam emulsion disclosed in U.S. Pat. No. 3,809,764 to Gabby, et al.

Various attempts have been made to produce water-continuous low fat spreads having a fat content of less than about 20%. For example, low fat milk or vegetable protein-containing water-continuous emulsions are disclosed in U.S. Pat. No. 5,614,245 to Gupta, et al. A low fat spread containing a structuring amount of oligofructose in combination with added mono- or disaccharide in an amount of about 0.1 to about 15 wt % is disclosed in U.S. Pat. No. 5,624,702.

It is highly important in the field of low fat spreads to generate products having good spreading properties, i.e., spreadable at storage temperature (4° C.), as well as sufficiently reduced fat content. From the perspective of the food industry, it is desirable that a low fat spread be easily extruded so that it may be shaped into various forms on demand, allowing for portion control with ease of dispensing and no waste.

It is also desirable that a low fat spread have a slow melting rate so that the spread can be applied to hot foods during preparation and retain its shape until presented to a diner.

It is an object of the invention to provide low fat spread products having good flavor, texture and appearance, as well as good spreadability over a wide range of temperatures and a slow melt rate.

SUMMARY OF THE INVENTION

The present invention provides an oil-in-water emulsion spread that has a low fat content and good spreading properties at all temperatures from 4° C. to 25° C. The present whipped spread comprises a continuous aqueous phase comprising (A) from about 10% to about 45% fat, wherein at least a portion of the fat is vegetable oil; (B) an effective amount of an emulsifier; and (C) an effective amount of an emulsion stabilizing agent. The whipped spread has a whipping overrun of at least about 200%. In a preferred embodiment of the invention the whipped spread comprises a mixture of coconut oil and palm kernel oil.

In another aspect of the invention there is provided a method for making a whipped low fat spread comprising (1) emulsifying together a fat phase, which comprises vegetable oil and an aqueous phase containing water-soluble and dispersible ingredients to produce an oil-in-water emulsion containing from about 10% to about 45% fat, and effective amounts of emulsifier and emulsion stabilizer to form a stable emulsion;

(2) pasteurizing the emulsion;

(3) homogenizing the pasteurized emulsion;

(4) cooling the pasteurized emulsion; and (5) whipping the cooled emulsion to a whipping overrun of at least 200%.

In the context of this invention, "butter-like" or "margarine-like" spread means a product which has the spreading characteristics and sensation on the palate of either butter or margarine. The term "oil" is used herein to mean a fat in the liquid state.

DETAILED DESCRIPTION OF THE INVENTION

Figure 1:
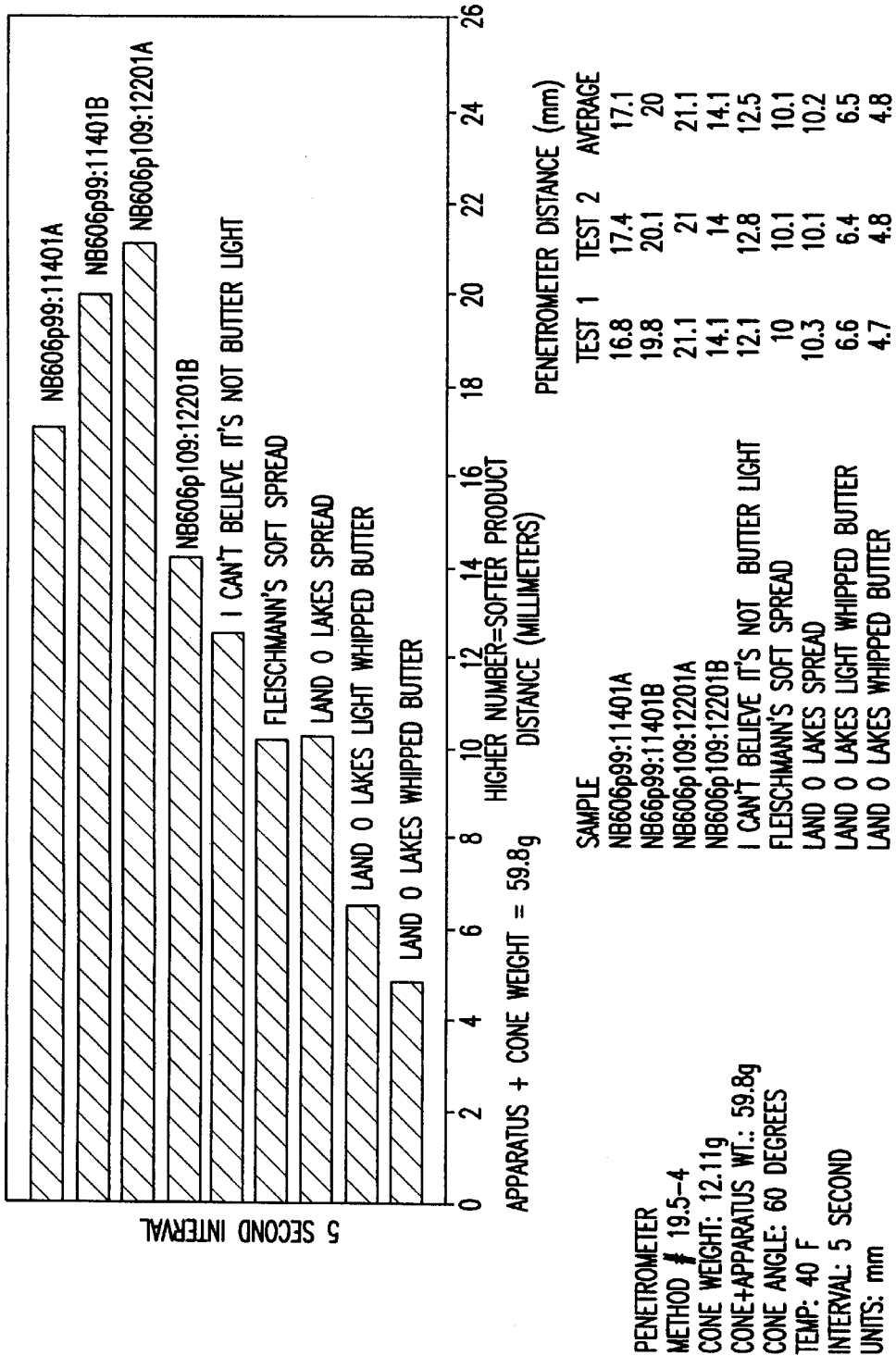
FIG. 1 is a bar graph of the results of penetrometer analyses of various commercially available low fat spreads and spreads made according to the invention at 40° F.

The whipped oil-in-water spreads in accordance with the present invention are suitable for use as a butter or margarine substitute. The present whipped spreads are useful as the base from which sauces, such as bechamel, Hollandaise and the like are made. The spreads are also suitable for baking and show good microbiological stability.

The fat used in the fat phase of the spread is selected from milk fat, vegetable oils, vegetable fats, animal fats, hydrogenated vegetable oils or mixtures of any of the foregoing. The fat may have been subjected to interesterification or fractionation treatment if desired. If milk fat is used, it may be in the form of butter, butter oil, cream, concentrated cream, anhydrous milk fat, fractionated milk fat or mixtures thereof. The vegetable oils that are used in the present low fat spreads are selected from any of the vegetable oils normally used in the manufacture of margarine and low fat margarine-like spreads. Typical vegetable oils include coconut oils, palm kernel oil, rapeseed oil, soya oil, sunflower oil, corn oil and the like, including the hydrogenated forms thereof.

The low fat spreads of the invention contain at least one type of vegetable oil and in a preferred embodiment, the spread contains a mixture of two or more different vegetable oils that provide different effects on firmness of the resulting spread, such as, for example palm kernel oil and coconut oil. The ratio of the oils to one another is adjusted to provide the desired firmness of the spread. For example, the higher the amount of coconut oil in the spread, the softer the product. The higher the amount of palm kernel oil, the firmer the product. The spreads of the invention contain such vegetable oil or oils at a ratio to one another of about 100:0 to about 0:100. Preferably, the ratio of vegetable oils having different firmness characteristics to one another is about 20:1 to about 1:20, and most preferably, about 5:1 to about 1:5. For example, the spread may contain as the vegetable oil component 100% coconut oil (a soft spread) or 100% palm kernel oil (a firmer spread) or any other desired vegetable oil. In a preferred embodiment of the invention, the spread contains coconut oil and palm kernel oil, preferably at a ratio of from about 1:4, most preferably at about 1.25:0.25 (coconut oil:palm kernel oil). Preferred oils include Neutresca® 55-43, a hydrogenated coconut oil and Neutresca® 62-44, a hydrogenated palm kernel oil, available from Aarhus, Inc., Port Newark, N.J. Although tropical oils are most preferred, the spread may contain any vegetable oils typically used in the production of margarine-like spreads, alone or in combination, e.g., soya oil, rapeseed oil, sunflower oil, and the like, the ratios of which are adjusted to provide a spread having the desired degree of firmness.

In a preferred embodiment, the spreads of the invention contain a flavoring amount of butter oil, butter fat or cream or milk fat, in combination with vegetable oil. Preferably the amount of butter oil, butter fat or cream/milk fat is not more than about 10% to about 1% of the total amount of fat in the spread and more preferably less than 7% to about 3% of the total amount of fat in the spread. Preferably, the amount of butter fat in the low fat spreads of the invention is sufficiently low to render the spreads cholesterol-free.

Preferably the amount of fat or oil present in the spread is about 45% or less by weight based on the total weight of the spread. More preferably the amount of fat in the spread is in the range of from about 10 to about 32%. Most preferably the amount of fat present in the spread is in the range of from about 15 to about 30% by weight. It is generally preferred to homogenize the emulsion in order to ensure that the fat is adequately dispersed throughout.

The spreads of the invention exhibit a conductivity value typical of oil-in-water emulsions. Conductivity is a measure of the ability of a material to carry an electric current. The standard measure of conductivity is the reciprocal of the resistance in ohms, measured between the opposing faces of 1 centimeter cube of liquid at a specific temperature. The conductivity value is obtained by multiplying the conductance value by the cell constant. Typically, the conductivity of the present spreads at room temperature (about 74° F.) is at least about 1500 micro Siemen per centimeter ($\mu$S/cm).

The whipped spreads of this invention contain emulsifying and emulsion stabilizing agents. A wide variety of emulsifiers may be employed in amounts from about 0.05% to about 5%, preferably from about 0.02% to about 1.5%. The emulsifiers induce the formation of a stable emulsion and improve the rate and total aeration obtained. Among the more suitable emulsifiers are lecithin, hydroxylated lecithin, mono-, di- or polyglycerides of fatty acids, such as stearin and palmitin mono- and diglycerides, polyoxyethylene ethers of fatty esters of polyhydric alcohols, fatty esters of polyhydric alcohols, polyglycerol esters of mono- and diglycerides, and the like. A preferred emulsifier is the polyoxyethylene ether of Sorbitan Monostearate, polysorbate 60, available as Glycosperse® S-20, or Sorbitan Monostearate available as Glycomul® S, all from Lonza Specialty Chemicals, Fair Lawn, N.J. Lecithin is also a preferred emulsifier and is available from Central Soya, Fort Wayne Ind., under the trademark Centrol® 3F UB. Combinations of emulsifiers may be used in the low fat spreads.

The emulsion compositions of the invention also include one or more emulsion stabilizer to improve the body and texture of the spread, and as an aid in providing freeze-thaw stability. Examples of suitable emulsifiers include polysorbate, such as polysorbate 60 and Sorbitan Monostearate, mono- and diglycerides, egg yolk and phospholipids. Suitable emulsion stabilizing proteins include for example milk proteins, such as whey proteins, buttermilk proteins, milk powders (buttermilk, whole or skim), milk concentrates (buttermilk, whole or skim) and the like, soya proteins. Another preferred emulsion stabilizer is sodium caseinate, such as Alanate 110®, available from New Zealand Milk Products, Inc., Santa Rosa, Calif. The present whipped spreads typically contain from about 0.2 to about 2% of emulsion stabilizer. Other suitable emulsion stabilizers include gelatin, alginate, agar, carrageenan as well as various gums, such as guar gum and xanthum gum, such as Keltrol® available from Merck & Co., Inc., Kelco Division, U.S.A., starch derivatives and cellulose and its derivatives, and combinations thereof. It is preferred that guar gum and/or xanthum gum be included in the spread to enhance mouth feel of the spread.

Sweeteners that are suitable for use in the present spreads include corn syrup, high fructose corn syrup, dextrose and maltodextrins, for example. Maltodextrins having minimum sweetness, such as Maltrin® M-180 or Maltrin® M-200 (Grain Processing Corp., Muscatine, Iowa), are most preferred. The low fat spreads of the invention preferably contain a high fructose corn syrup, minimum sweetness maltodextrin, dextrose and or combinations thereof. The particular sweetener or ratio of sweeteners used in the present spreads may be varied to obtain preferred levels of sweetness. For example, the dextrose equivalence of the corn syrup can be varied to obtain the desired sweetness. A preferred corn syrup is Clearadex® 36/43 (Cargill, Cedar Rapids, Iowa), which has a dextrose equivalent of 36. Sweeteners typically comprise from about 10% to about 25% of the low fat spreads of the invention.

The sweeteners also lend body to the spread. Gelling maltodextrins, however, are not particularly desirable for use in the present low fat spreads of this invention since these spreads are sufficiently stabilized by the incorporation of various gums and/or proteins.

Many types of salts may be used in the present spreads for buffering and flavoring, including sodium chloride, sodium or potassium phosphate, citrates, chlorides and the like, in amounts form about 0% to about 5%, preferably from about 0.1% to about 1.0%.

The nature of the spreads of this invention enables the incorporation thereinto of a variety of flavoring agents. Such flavor ingredients include for example, butter flavor, such as Butr Pow'r® NAF 764, which provides a creamy butter flavor (CHR Hansen, Milwaukee, Wis.), honey, herbs and/or herb flavor, spices and flavored versions including cinnamon and nutmeg, various flavors such as chocolate, anise, coffee, Ameretto® and Kahlua®, savory inclusions such as onion, garlic, chives, thyme, parsley and the like. All of these ingredients may be entirely natural or synthetic. A preferred flavoring agent is Vegetone® available from Kalsec, 3713 Main St., Kalamazoo, Mich.

The aqueous phase of the present invention, may also comprise in addition to water, a thickening agent or agents, coloring agents, pH adjusting agents and/or preservatives. Other ingredients commonly added to low fat spreads such as nutrient enhancers, such as protein concentrates and isolates and vitamins may also be added. Beta-Carotene 30% FS, available from Hoffmann-La Roche, Inc., Paramus, N.J., is a preferred coloring agent used in the spreads of invention.

The products of this invention can be prepared by any conventionally used food processing method, typically by any method used to prepare whipped toppings and other whipped products. Preferably, the spreads are prepared by adding a premix of water soluble and water dispersible dry ingredients including emulsifiers, emulsion stabilizers, optional texturizers, and any salt, and sweetener to the fat/oil which has been pre-mixed with coloring agent. This mixture is constantly mixed. Heated water is then added, e.g., 160°–190° F., preferably 170° F. to disperse all of the dry ingredients and dissolve the sweetener. This mixture is continually agitated for a few minutes before being transferred to a pasteurizer. The mixture is pumped to the pasteurizer and emulsifier, such as polysorbate 60 and/or Sorbitan Monostearate is added. The mixture is heated to about 165° F.±3° F. for about one to thirty minutes, preferably about five minutes, to pasteurize the mixture. High temperature, short time pasteurization is an alternate process.

The blended, pasteurized ingredients are then passed through a homogenizer of the typical dairy type. Flavoring agents, if desired are preferably added just before homogenization. Although homogenization may be obtained in a one-step process, the mixture is preferably homogenized in a two stage process at about 500 to about 1,000 psi, preferably about 500 psi (first stage) and at about 2,000 to about 10,000 psi, preferably about 6500 psi (second stage) for a total of about 7000 psi to disperse the fats as particles of about 0.5 to about 2 μm size, preferably about 1 μm. The mix is usually maintained at a temperature of from about 140° F. to about 190° F. during homogenization.

The resulting emulsion is preferably cooled by a two stage process, first to about 95° to about 105° F., preferably through a plate heat exchanger. The cooled product is then further cooled to about 45° F. to 55° F. The cooled product is then stored where it is tempered and cooled to about 47° to about 49° F. at a rate no more than 2° F. per hour, and held at that temperature for a period of up to about 16 hours and at least about 8 hours.

The refrigerated product can then be whipped by conventional means to the desired overrun. Maximum overrun is obtained at approximately the half way point to the end point, the end point being the desired optimum visual stiffness of the product. The whipped spreads according to the invention have a whipping overrun of from about 200 to 350%, preferably about 300%.

Alternatively, the homogenized and cooled homogenized product can be stored frozen (–20° C.) in liquid form indefinitely and thawed, aliquoted and whipped to the desired stiffness when needed. The integrity of the emulsion is maintained during freezing.

The whipped spreads according to the invention exhibit satisfactory spreadability over a wide range of temperatures, i.e., about 32° to about 60° F. without being excessively hard at the lower temperatures nor excessively soft at the high temperatures. The amount of solid fat in the spread has little effect on the spreadability of the product. Instead, spreadability is manipulated in two ways, e.g., 1) by the amount of whipping energy applied during the manufacturing process and 2) the types and ratios of fat/oil present in the spread.

A means for characterizing the spreadability (softness) of the whipped low fat spreads of the invention is in terms of the Penetrometer test. In this type of analysis, the cone of the penetrometer is suspended above and dropped onto the smoothed surface of freshly prepared product that has been tempered at about 40° F.±2° F. for 48 hours. The cone is released and allowed to descend for exactly five seconds and the depth of penetration is recorded. Penetration depth is determined for product samples at various temperatures. Penetration is usually scored in tens of millimeters at the temperature of measurement. The higher the number, the softer and more spreadable the product. The low fat spreads of the invention are characterized by penetrometer values indicating high spreadability over a wide range of temperatures.

The spreads of the invention exhibit microbiological stability at 4° C. for at least about two weeks. The spreads can be maintained at freezer temperature indefinitely without disruption of the integrity of the spread.

The invention is illustrated by the following Examples.

EXAMPLE 1

Preparation of a 32% Fat Spread

TABLE 1

| INGREDIENT | PERCENT | WEIGHT (GRAM) |
|---|---|---|
| Water | 47.295 | 9,450 |
| Coconut Oil | 17.00 | 3,400 |
| Palm Kernel Oil | 10.00 | 2,000 |
| 36 DE/43 Corn Syrup | 10.00 | 2,000 |
| Maltrin ® M-180 | 8.00 | 1,600 |
| 99.5% Butter Oil | 5.00 | 1,000 |
| Polysorbate 60 | 0.295 | 59 |
| Beta Carotene | 0.01 | 2 |
| Sodium Caseinate | 1.30 | 260 |
| Dextrose | 0.44 | 88 |
| Salt | 0.30 | 60 |
| Sorbitan Monostearate | 0.20 | 40 |
| Guar Gum | 0.08 | 16 |
| Xanthum Gum | 0.08 | 16 |

Coloring agent (beta carotene) was admixed with a small amount of coconut oil to completely disperse the colorant. The remaining coconut oil and butter oil were added to a pasteurizer and thoroughly mixed with the colorant/coconut oil. A premix containing sodium caseinate, dextrose, salt, Sorbitan Monostearate, guar gum and xanthum gum was added, followed by addition of corn syrup, heated water and maltodextrin. The mixture was stirred to dissolve the maltodextrin, polysorbate 60 was added and the mixture was heated to about 165° F. for about one minute. The mixture was homogenized by a two step process at 500/7000 psi. The homogenate was cooled to about 47°–49° F. through a plate heat exchanger. The cooled liquid mixture was further cooled at no more that 2° F. and stored refrigerated overnight. Three aliquots of the refrigerated liquid were whipped. One aliquot was whipped in a Hobart® Mixer to an overrun of 312%; second and third aliquots were separately whipped in an Oakes® Machine to a product overrun of 317% (PDT 1A) and 276% (PDT 1B) overrun, respectively.

Each of the three whipped products exhibited excellent texture and taste.

EXAMPLE 2

Preparation of a 24% Fat Spread

TABLE 2

| INGREDIENT | PERCENT | WEIGHT (GRAM) |
|---|---|---|
| Coconut Oil | 21 | 4,200 |
| 36 DE/43 Corn Syrup | 10 | 2,000 |
| Maltrin ® M-200 | 8 | 1,600 |
| 99.5% Butter Fat | 3 | 600 |
| Polysorbate 60 | 0.295 | 59 |
| Vegetone ® | 0.0062 | 1.24 |
| Dextrose | 0.44 | 88 |
| Guar Gum | 0.08 | 16 |
| Xanthum Gum | 0.08 | 16 |
| Sorbitan Monostearate | 0.20 | 40 |
| Sodium Caseinate | 1.3 | 260 |
| Salt | 0.25 | 50 |
| Water | 55.3488 | 11,069.76 |

A low fat spread (24% fat) containing the ingredients listed in Table 2 was prepared as described above in Example 1.

The refrigerated liquid was whipped in a Hobart® Machine, a conventional bench top mixer, to a product overrun of 293%. The whipped spread was easily extruded and spread at all useable temperatures.

EXAMPLE 3

Preparation of a 22% Fat Spread

TABLE 3

| INGREDIENT | PERCENT | WEIGHT (GRAM) |
|---|---|---|
| Water | 49.21 | 9,849.2 |
| Palm Kernel Oil | 13.50 | 2,700 |
| Coconut Oil | 13.50 | 2,700 |
| Maltrin ® M-180 | 16 | 3,200 |
| 99.5% Butter Oil | 5 | 1,000 |
| Polysorbate 60 | 0.295 | 59 |
| Beta Carotene | 0.009 | 1.8 |
| Sodium Caseinate | 1.300 | 260 |
| Maltrin ® M-180 | 0.440 | 88 |
| Salt | 0.350 | 70 |
| Sorbitan Monostearate | 0.200 | 40 |
| Guar Gum | 0.080 | 16 |
| Xanthum Gum | 0.080 | 16 |

A low fat spread (22% fat) containing the ingredients listed in Table 3 was prepared as described in Example 1. Three aliquots of the refrigerated liquid were whipped. One aliquot was whipped in a Hobart® Mixer to an overrun of 314%; second and third aliquots were separately whipped in an Oakes® Machine, a continuous production model mixer, to a product overrun of 305% (PDT 2A) and 272% (PDT 2B) overrun, respectively. Each of the three whipped products exhibited excellent texture and taste.

EXAMPLE 4

Preparation of a 22% Fat Spread

TABLE 4

| INGREDIENT | PERCENT | WEIGHT (GRAM) |
|---|---|---|
| Water | 48.596 | 9,719.2 |
| Palm Kernel Oil | 13.5 | 2,700 |
| Coconut Oil | 13.5 | 2,700 |
| Maltrin ® M-180 | 16 | 3,200 |
| 99.5% Milk Fat | 5 | 1,000 |
| Polysorbate 60 | 0.295 | 59 |
| Beta Carotene | 0.009 | 1.80 |
| Sodium Caseinate | 1.30 | 260 |
| Maltrin ® M-180 | 0.44 | 88 |
| Salt | 1.00 | 200 |
| Sorbitan Monostearate | 0.20 | 40 |
| Guar Gum | 0.08 | 16 |
| Xanthum Gum | 0.08 | 16 |

A low fat spread (22% fat) containing the ingredients listed in Table 3 was prepared as described in Example 1. The refrigerated liquid was whipped in a Hobart® Machine to a product overrun of 312%. The whipped spread was easily extruded and spread at all useable temperatures.

EXAMPLE 5

Penetrometer Analysis of Spreads

A standardized comparison test for softness was carried out on samples PDT 1A and PDT 1B from Example 1 and PDT 2A and PDT 2B from Example 3 using the RPC No. 19.5-4 penetrometer test. Also, a spread containing the following ingredients as shown in Table 5 was prepared as described in Example 1. The spread was divided into five samples and each sample was whipped to a different overrun. The five samples were also analyzed by the penetrometer test.

TABLE 5

| INGREDIENT | PERCENT | WEIGHT (GRAM) |
|---|---|---|
| Water | 48.901 | 14,670.3 |
| Coconut Oil | 15 | 4,500 |
| Maltrin ® M-180 | 15 | 4,500 |
| Palm Kernel Oil | 12 | 3,600 |
| Butter Oil | 5 | 1,500 |
| Polysorbate 60 | 0.3 | 80 |
| Beta Carotene | 0.01 | 3 |
| Sodium Caseinate | 1.3 | 390 |
| Maltrin ® M-180 | 0.44 | 132 |
| Salt | 0.9 | 270 |
| Sorbitan Monostearate | 0.2 | 60 |
| Guar Gum | 0.07 | 21 |
| Xanthum Gum | 0.07 | 21 |
| Butter Paste | 0.8 | 240 |
| Flavor 1939 (Vanilla Flavor) | 0.009 | 2.7 |

Five samples of the above composition were whipped to provide the following products:

B: overrun 255%

C: overrun 277%

D: overrun 298%

E: overrun 300%

F: overrun 304%

Two spreads containing the same ingredients listed in Table 5 except that the amount of coconut oil was reduced from 15% to 5% and the amount of palm kernel oil was increased from 12% to 20% and water content was increased to 50.4% were also prepared by the process described in Example 1. One of the samples was whipped at a rotor speed of 378 RPM to a whipping overrun of 291% (Sample 1:4

1); the other sample was whipped at a rotor speed of 338 RPM to an overrun of 319% (Sample 1:4 #2). These two samples were also analyzed for softness using the penetrometer test.

Each of the freshly whipped test samples (1A, 1B, 2A, 2B, samples B–F and samples 1:4 #1 and 1:4 #2) was tempered at 40°±2° F. for 48 hours. The tempered product was placed in a holder and the upper surface of the product was smoothed with an edging tool to make a flat surface.

The penetrometer cone (12.11 g) was adjusted to hang at a 60° angle above the center of the smoothed surface of the test sample. The cone was lowered so as to just touch the surface of the test sample. Once adjusted, the cone was released for exactly five seconds and the depth of penetration into the test sample was recorded (millimeters at the test temperature). The test was carried out at 40° F.

The test was also carried out using various commercially available butter-like and margarine-like spreads, i.e., "I Can't Believe It's Not Butter"® and "I Can't Believe It's Not Butter"® Lite, "I Can't Believe It's Not Butter"® With Sweet Cream Buttermilk, Shedd's Spread Country Crock Churnstyle, all available from Van Den Bergh Foods Co., Lisle, Ill., Fleishman's "Soft Spread"®, Move Over Butter® with Sweet Cream Buttermilk, available from Nabisco Foods, East Hanover N.J., Lee Iacocca's Olivio™ Spread (60% Vegetable Oil) distributed by Nicola Corp., Boston, Mass., and Land O' Lakes Spread. Each of these commercially available products was tempered and tested as described for the freshly whipped spreads of the invention. The results are shown in FIGS. 1 and 2 and/or in Table 6.

As can be seen from the data in FIGS. 1 and 2 and the data in Table 6 the typical penetrometer depth for the spreads of the invention ranged from about 14 to 29.2, while the penetrometer depth of commercially available low fat spreads was in the range of from 10 to 12. Thus, the spreads of this invention are softer and more easily spread and extruded.

EXAMPLE 6

TA. XT2 Texture Analysis

Softness of the commercially available products and invention samples B–F and samples 1:4#1 and 1:4#2, which were tested in Example 5 was also determined using a Texture Analyser model TA.XT2 made by Texture Technologies Corp., Scarsdale, N.Y. The texture analyzer was adjusted to apply a 300 gram force to the test samples which were packed into three ounce plastic cups. The samples had been tempered overnight at 40° F.±2° F. The following settings were used:

Probe: Plunger type, 48 mm diameter×8 mm depth aluminum disk attached to 120 mm length aluminum rod Pre-test Speed: 5.0 mm/sec Test Speed: 5.0 mm/sec Post-Test Speed: 10 mm/sec Force: 300 g Time: 10 sec Trigger Force: Auto 100 g Data Acquisition Rate: 200 points/sec The distance the analyzer probe traveled into the sample to maintain the force for ten seconds was measured. Results were calculated using Texture Expert™ for Windows™. The results are shown in Table 6.

TABLE 6

| | PENETROMETER mm | TA.XT2 mm |
|---|---|---|
| TEST SAMPLE | | |
| B | 27.9 | 5.4 |
| C | 27.2 | 7.6 |
| D | 23.0 | 1.3 |
| E | 21.3 | 11.1 |
| F | 19.7 | 0.5 |
| PDT1A (Example 1) | 17.1* | NA |
| PDT1B (Example 1) | 20.0* | NA |
| PDT2A (Example 3) | 21.1* | NA |
| PDT2B (Example 3) | 14.1* | NA |
| 1:4 #1 | 23.8 | 1.5 |
| 1:4 #2 | 27.9 | 4.3 |
| COMMERCIAL SPREADS | | |
| Fleishman's | 11.0 | 0.3 |
| Olivio ™ Spread | 11.8 | NA |
| I Can't Believe It's Not Butter ® Light | 11.9 | 0.2 |
| Land O' Lakes w/Sweet Cream Buttermilk | 9.5 | 0.1 |
| Move Over Butter ® w/Sweet Cream Buttermilk | 9.7 | 0.2 |
| Shedd's Spread Country Crock Churnstyle | 8.3 | 0.0 |
| I Can't Believe It's Not Butter ® w/Sweet Cream Buttermilk | 9.3 | NA |

NA = not analyzed
* = average of two analyses

The data obtained from the TA.XT2 analysis of the samples and commercially available products confirm the results obtained in the Penetrometer analysis.

EXAMPLE 7

Comparative Nutritional Profiles of Butters, Margarines and Spreads

The nutritional profiles of various commercially available butters, margarines and reduced fat spreads were compared to the that of typical invention spreads and the results are shown in Table 7.

TABLE 7

|  | BUTTER | WHIPPED BUTTER | | MARGARINE | | | INVENTION | BORDENS | BECEL |
|---|---|---|---|---|---|---|---|---|---|
|  |  |  |  | Regular |  | Fleischman | Whipped Low | Spreadable | Reduced Cal. |
|  | Regular g/serving | Regular g/serving | Light g/serving | (Mazola) g/serving | Light g/serv | SoftSpread ® g/serving | Fat Spread g/serving | Light Butter* g/serving | Margarine g/serving |
| Total Fat | 11 | 7 | 3.5 | 11 | 5 | 9 | 2 | 6.0 | 3.8 |
| Sat. Fat | 7 | 5 | 2.5 | 2 | 1 | 1.5 | 2 | 2.5 | 0.5 |
| Polyunsat. | 0.5 | 0.5 | 0.3 | 3.5 | 2.5 | 4 | 0 | 0.5 | 1.5 |
| Monounsat | 0.3 | 0.3 | 0.2 | 3 | 1.5 | 2.5 | 0 | 0.3 | 1.5 |
| Cal/Serv. | 100 | 60 | 30 | 100 | 45 | 80 | 15–20 | 50 | 35 |
| FatCal/Serv | 100 | 60 | 30 | 100 | 45 | 80 | 10–15 | 50 | 35 |
| g/Serv. (1 TBS) | 14 | 9 | 9 | 14 | 14 | 14 | 5 | 14 | 14 |
| Cholesterol (mg/Serv.) | 30 | 20 | 10 | 0 | 0 | 0 | 0 | 10 | 0 |
| Vit. A % | 6 | 6 | 6 | 6 | 0 | 10 | 0 | 10 | 11 |
| Vit. D % |  |  |  |  |  | 15 |  |  | 28 |
| Overrun % | 0 | 36 | 36 | 0 | 0 | 0 | 300 | 0 | 0 |

*New product in test market in Idaho

EXAMPLE 8

Conductivity Analysis of Spreads

A spread was made according to Example 5 and divided into five whipped test samples as described in Example 5 (Samples B–F). Two spreads containing the same ingredients listed in Table 5 except that the amount of coconut oil was reduced from 15% to 5% and the amount of palm kernel oil was increased from 12% to 20% and water content was increased to 50.4% were also prepared by the process described in Example 5 (Samples 1:4#1 and 1:4#2).

Each of the invention samples and various commercially available butter-like or margarine-like spreads were analyzed for conductivity. The conductivity test was also carried out using whole milk, distilled water and two commercially available whipped products, Rich's Buttercreme® and Rich's Whip Topping®, available from Rich Products, Buffalo, N.Y. for comparison purposes.

The samples were analyzed using an Orion Model 115 Conductivity Meter, with paste/cream cell #018014, cell constant K=0.973. Test samples were equilibrated to room temperature (approximately 74° F.). A Traceable One-Shot™ standard (VWR Scientific) was used for calibration. The data are shown in Table 8 (1/ohm=1 mho=1 Siemen).

TABLE 8

|  | CONDUCTIVITY ($\mu$S/cm) |
|---|---|
| TEST SAMPLE |  |
| B | 2350 |
| C | 2300 |
| D | 2630 |
| E | 2310 |
| F | 2330 |
| 1:4 #1 | 2100 |
| 1:4 #2 | 2050 |
| COMMERCIAL PRODUCTS |  |
| Olivio ™ Spread | 0.0 |
| I Can't Believe It's Not Butter ® Light | 0.8 |
| Land O' Lakes w/Sweet Cream Buttermilk | 0.0 |

TABLE 8-continued

|  | CONDUCTIVITY ($\mu$S/cm) |
|---|---|
| Move Over Butter ® w/Sweet Cream Buttermilk | 0.0 |
| Shedd's Spread Country Crock Churnstyle | 0.0 |
| I Can't Believe It's Not Butter ® w/Sweet Cream Buttermilk | 0.2 |
| Distilled Water | 0.8 |
| Tap Water | 376 |
| Rich's Buttercreme ® | 538 |
| Rich's Whip Topping ® | 1709 |
| Whole Milk | 6550 |

EXAMPLE 9

Melting Rate

The melting rates of low fat spreads according to the invention were compared with the melting rate of a commercially available spread, "I Can't Believe It's Not Butter"® Light, using the method described in Adams, K. D., et al., 1990, Shelf Stable, Highly Aerated Reducd Calorie Food Products, U.S. Pat. No. 4,919,964. Potatoes of similar size were baked in a microwave oven. The baked potatoes were split lengthwise and slightly compressed from the ends. Spreads were placed on the potatoes and the time required for complete melting of the spread was determined. The results are shown in Table 9.

TABLE 9

| SPREAD SAMPLE | POTATO WEIGHT (Grams) | SPREAD WEIGHT (Grams) | POTATO TEMP. (°F.) | MELT TIME (Seconds) |
|---|---|---|---|---|
| I Can't Believe It's Not Butter ® Light | 106.03 | 5.21 | 198 | 0 |
| (Completely Melted) |  |  | 193 | 15 |
|  |  |  | 190 | 30 |
| 1:4 #1 | 105.7 | 2.83 | 202 | 0 |
|  |  |  | 198 | 0 |

TABLE 9-continued

| SPREAD SAMPLE | POTATO WEIGHT (Grams) | SPREAD WEIGHT (Grams) | POTATO TEMP. (°F.) | MELT TIME (Seconds) |
|---|---|---|---|---|
| (Completely Melted) | | | 194 | 120 |
| 1:4 #2 | 120.1 | 3.00 | 204 | 0 |
| | | | 196 | 60 |
| (Completely Melted) | | | 192 | 120 |

What is claimed is:

1. A whipped spread which is an oil-in-water dispersion comprising a continuous aqueous phase wherein:
   said continuous aqueous phase comprises (A) from about 10% to about 45% fat wherein at least a portion of said fat is vegetable oil; (B) an effective amount of an emulsifier; and (C) an effective amount of an emulsion stabilizing agent, and
wherein
   said spread has a whipping overrun of at least about 200%.

2. The whipped spread according to claim 1 wherein said fat comprises tropical oil.

3. The whipped spread according to claim 1 wherein said fat comprises 100% vegetable oil.

4. The whipped spread according to claim 1 wherein the vegetable oil comprises a mixture of two different vegetable oils.

5. The whipped spread according to claim 4 wherein the mixture of vegetable oils comprises coconut oil and palm kernel oil.

6. The whipped spread according to claim 5 wherein the coconut oil and palm kernel oil are present at a ratio of 1:20 to 20:1 coconut oil to palm kernel oil.

7. The whipped spread according to claim 6 wherein the coconut oil to palm kernel oil are present at a ratio of about 1.25:0.25 coconut oil to palm kernel oil.

8. The whipped spread according to claim 1 wherein said fat comprises a flavoring amount of dairy fat.

9. The whipped spread according to claim 8 wherein the dairy fat is selected from the group consisting of butter oil, butter fat and milk fat.

10. The whipped spread according to claim 8 wherein the dairy fat comprises less than about 10% to about 1% of the total fat of the spread.

11. The whipped spread according to claim 1 wherein the emulsion stabilizing agent comprises sodium caseinate.

12. The whipped spread according to claim 1 wherein the continuous aqueous phase further comprises gums selected from the group consisting of guar gum, xanthum gum and combinations thereof.

13. The whipped spread according to claim 1 wherein the spread has a whipping overrun of at least about 300%.

14. The whipped spread according to claim 13 wherein a one tablespoon serving of the spread contains about 5 grams or less of fat.

15. The whipped spread according to claim 1 wherein the total amount of fat in the spread is in the range of from about 15 to about 30%.

16. The whipped spread according to claim 1 wherein the spread has a conductivity of at least about 1500 μS/cm.

17. The whipped spread according to claim 1 wherein the emulsifier is selected from the group consisting of polysorbate 60, Sorbitan Monostearate and combinations thereof.

18. The whipped spread according to claim 1 further comprising carbohydrates selected from the group consisting of dextrose, maltodextrin, corn syrup, high fructose corn syrup, and combinations, thereof.

19. The whipped spread according to claim 1 further comprising flavoring agent, salt and colorant.

20. The whipped spread according to claim 1 wherein said spread is frozen.

21. A process for producing a whipped low fat spread in the form of an oil-in-water emulsion comprising
   (1) emulsifying together a fat phase, said fat phase comprising vegetable oil, an aqueous phase containing water-soluble and dispersible ingredients and effective amounts of emulsifier and emulsion stabilizer to form a stable oil-in-water emulsion containing from about 10% to about 45% by weight fat;
   (2) pasteurizing the emulsion;
   (3) homogenizing the pasteurized emulsion;
   (4) cooling the pasteurized emulsion; and
   (5) whipping the cooled emulsion to a whipping overrun of at least 200%.

22. The process according to claim 21 wherein homogenization is effected by a two stage process including a first stage homogenization at 500 to 1,000 psi and a second stage homogenization at about 2,000 to 10,000 psi for a total of about 7,000 psi.

23. The process according to claim 21 wherein cooling of the pasteurized emulsion is effected by a two stage process wherein the pasteurized emulsion is first cooled to about 95° F. to about 105° F. followed by cooling to about 45° to 55° F., and then tempering the cooled emulsion to a temperature of about 47° to 49° F. at a rate of about 2° F. or less per hour.

24. The process according to claim 23 wherein the cooled emulsion is tempered at about 47° to about 49° F. for at least about eight hours and up to about sixteen hours.

25. The process according to claim 21 wherein the pasteurized emulsion is cooled and then frozen prior to whipping.

26. A low fat whippable spread which is an oil-in-water dispersion comprising a continuous aqueous phase wherein:
   the continuous aqueous phase comprises (A) from about 10% to about 45% fat wherein at least a portion of the fat is vegetable oil; (B) an effective amount of an emulsifier; and (C) an effective amount of an emulsion stabilizing agent, and
wherein
   said spread is whippable to an overrun of at least about 200%.

27. The whippable spread according to claim 26 wherein said spread is frozen.

* * * * *